United States Patent
Niwa

(10) Patent No.: US 7,085,085 B2
(45) Date of Patent: Aug. 1, 2006

(54) DISK DRIVING APPARATUS AND METHOD FOR OPERATING DISK DRIVING APPARATUS

(75) Inventor: Takahiro Niwa, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 56 days.

(21) Appl. No.: 11/016,746

(22) Filed: Dec. 21, 2004

(65) Prior Publication Data

US 2005/0276200 A1      Dec. 15, 2005

(30) Foreign Application Priority Data

Jun. 11, 2004    (JP)   ............................. 2004-174344

(51) Int. Cl.
*G11B 5/09*      (2006.01)

(52) U.S. Cl. .................. 360/51; 369/59.19; 369/47.48; 369/47.28

(58) Field of Classification Search ...................... None
See application file for complete search history.

(56) References Cited

U.S. PATENT DOCUMENTS 6,956,708 B1 *  10/2005  Sutardja et al. ................ 360/45

FOREIGN PATENT DOCUMENTS

JP      2004-087026      3/2004

* cited by examiner

*Primary Examiner*—Andrew L. Sniezek
(74) *Attorney, Agent, or Firm*—Arent Fox, PLLC.

(57) ABSTRACT

A first delay circuit receives a sampling clock obtained by multiplying detected frequency of reference clock patterns and outputs delay clocks from first delay stages, respectively. Recording frequency of the sampling clock is not obtained using the reference clock patterns but obtained using received addresses. A disk driving apparatus obtains the number of the first delay stages to be used which correspond to one cycle of the obtained recording frequency and necessary for phase adjustment of the sampling clock, and disables not-used first delay stages. Any of the delay clocks is selected and at least one of regenerating operation to read data from a disk media and recording operation to write data thereto is executed in synchronization with the selected delay clock. Consequently, the number of delay stages to be disabled can be obtained with simple control, reducing power consumption of circuits for adjusting phases of the sampling clocks.

10 Claims, 13 Drawing Sheets

| ZNO | 1 | 2 | ... | 10 | ... | 20 | ... | 50 | ... | DMAX=165ns 100 |
|---|---|---|---|---|---|---|---|---|---|---|
| RF[MHz] (cycle [ns]) | 12 (83.3) | 14 (71.4) | ... | 30 (33.3) | ... | 50 (20) | ... | 110 (9.1) | ... | 210 (4.8) |
| number of TP used (hexadecimal) | 259 (103) | 222 (DE) | ... | 103 (67) | ... | 62 (3E) | ... | 28 (1C) | ... | 15 (0F) |
| (round up of lower 4 bits) | (110) | (E0) | ... | (70) | ... | (40) | ... | (20) | ... | (10) |
| actual number of TP used | 272 | 224 | ... | 112 | ... | 64 | ... | 32 | ... | 16 |
| number of DIS disabled | 273 | 225 | ... | 113 | ... | 65 | ... | 33 | ... | 17 |

Fig. 6

DISK DRIVING APPARATUS AND METHOD FOR OPERATING DISK DRIVING APPARATUS

CROSS-REFERENCE TO RELATED APPLICATIONS

This application is based upon and claims the benefit of priority from Japanese Patent Application No. 2004-174344, filed on Jun. 11, 2004, the entire contents of which are incorporated herein by reference.

BACKGROUND OF INVENTION

1. Field of the Invention

The present invention relates to a disk driving apparatus and a method for operating a disk driving apparatus for recording or regenerating data with respect to a disk media which is served for recording data handled in a computer or the like.

2. Description of the Related Art

On a disk media such as an optical magnetic disk or the like, reference clock patterns are formed preliminarily in manufacturing process. The reference clock patterns are formed in the circumferential direction of respective tracks at a given interval. A disk recording/regenerating apparatus which records/regenerates data with respect to a disk media sequentially reads the reference clock patterns on the disk media which is rotated at a given speed and obtains reference clocks which are synchronized with the appearance of the patterns. The disk recording/regenerating apparatus generates sampling clocks by multiplying frequency of the reference clocks and records or regenerates data with respect to the disk media in synchronization with the sampling clocks. This type of method is referred to as an external clock system.

In the external clock system, processing for generating the sampling clocks and the processing for recording data and regenerated data are made independent from each other. Accordingly, in the disk recording/regenerating apparatus adopting the external clock system, it is necessary to correct the displacement of phase between the sampling clock and the data and hence, the disk recording/regenerating apparatus includes a variable delay circuit which performs the fine adjustment of the phases of the sampling clocks (for example, patent documents such as Japanese Unexamined Patent Application Publication No. 2004-87026).

The reference clock patterns are formed radially on the disk media. Accordingly, the interval of the reference clock patterns is shorter at the inside of the disk media. A rotational speed of the disk media, for recording/regenerating data in a stable manner without depending on the access position, is set to a low value when the apparatus gets access to the tracks on an inner peripheral side and is set to a high value when the apparatus gets access to the tracks on an outer peripheral side. Further, the recording frequency (frequency of sampling clocks) of data is set to a lower value as the access point approaches the inside of the disk media. Accordingly, the number of delay stages of the valuable delay circuit is set corresponding to the recording frequency of the data on the inner side of the disk media which has the longest cycle.

SUMMARY OF THE INVENTION

It is an object of the present invention to obtain delay stages which are used in the inside of a variable delay circuit with a simple control and to reduce the power consumption of a circuit for adjusting phases of sampling clocks.

In one aspect of the present invention, detection frequency of the reference clock patterns are multiplied to generate a sampling clock. The reference clock patterns are formed on the disk media along the circumferential direction in a given interval. The sampling clock is input to a first delay circuit where a plurality of first delay stages is connected in cascade. The first delay stages respectively output delay clocks which delay the sampling clock. A disk driving apparatus receives addresses which indicate positions in the radial direction on the disk media and, using the received addresses, obtains recording frequency of the sampling clock which correspond to the reference clock patterns formed in areas corresponding to the addresses.

The disk driving apparatus obtains the number of stages to be used out of the first delay stages necessary for the phase adjustment of the sampling clock corresponding to one cycle of the obtained recording frequency. The disk driving apparatus enables the first delay stages the number of which is equal to the number of stages to be used that has been obtained by an operational unit and disables the remaining first delay stages. Then, any one of the delay clocks is selected and at least one of the regeneration operation to read out data from the disk media and the recording operation to write data in the disk media is executed in synchronization with the selected delay clock.

Since the first delay stages which are unnecessary for the delay adjustment are disabled, the power consumption for adjusting the phases of the sampling clocks used in the regenerating operation and the recording operation can be reduced. Further, the delay stages to be disabled are obtained from addresses supplied to indicate access positions. Since the delay stages to be disabled can be obtained without getting access to the disk media, it is possible to prevent controls of the regenerating operation and the recording operation from becoming complicated. As a result, it is possible to provide the disk driving apparatus which can be controlled easily while reducing the power consumption.

In a preferred example of the above-mentioned one aspect of the present invention, an error detection unit outputs an error signal when the frequency of the sampling clock is deviated from a frequency range preset for each of the addresses due to a physical lack of the reference clock patterns. Accordingly, it is possible to surely prevent the execution of an erroneous regenerating operation and an erroneous recording operation. That is, the reliability of the disk driving apparatus can be enhanced.

In another preferred example of the above-mentioned one aspect of the present invention, the error detection unit includes a frequency divider, a second delay circuit, a second clock selection circuit and an error decision circuit. The frequency divider divides the frequency of the sampling clock to generate a divided clock. The second delay circuit has the same constitution as the first delay circuit and includes a plurality of second delay stages which are connected in cascade. The second delay circuit, upon receiving the divided clock, outputs second delay clocks from the second delay stages, respectively. Further, the second delay circuit enables the second delay stages the number of which is equal to the number of stages to be used that has been obtained for disabling a given number of first delay stages, and disables the remaining second delay stages.

The second clock selection circuit, in accordance with addresses, selects two clocks out of the second delay clocks which are output from the enabled second delay stages. The error decision circuit outputs an error signal when a transition edge of the sampling clock is not present during a period in which a transition edge of the divided clock is transmitted between the two selected second delay stages. Since not only the disabling of the first delay circuit but also the disabling of the second delay circuit can be controlled using the obtained number of stages to be used, the disable control can be performed easily. Further, the number of signal lines of control signals and the like for the disabling can be reduced.

In another preferred example of the above-mentioned one aspect of the present invention, the error decision circuit outputs an error signal when a transition edge of the sampling clock is not present during a period in which a rising edge of the divided clock is transmitted between the two selected second delay stages and during a period in which a falling edge of the divided clock is transmitted between the two selected second delay stages. Accordingly, the frequency of the error decision can be increased and hence, errors can be detected more reliably.

In another preferred example of the above-mentioned one aspect of the present invention, the disk media has a plurality of zones which are respectively allocated to a plurality of tracks adjacent to each other. The reference clock patterns are formed for respective tracks, and each of the addresses indicates one of these zones. Accordingly, the number of the first delay stages to be disabled is obtained in response to the change of the zones. Further, the disable control of the first delay stages is executed in response to the change of the zones. It is unnecessary to control the first delay stages for every change of the tracks and hence, the frequency of the disable control of the first delay stages can be lowered. That is, disable control can be performed easily.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 6 is an explanatory view showing the relationship among zone numbers, the recording frequency and the number of delay stages to be used;

DESCRIPTION OF THE PREFERRED EMBODIMENTS

The present invention has been made to overcome following drawbacks. With respect to the maximum delay time of a variable delay circuit, to arbitrarily adjust a phase of a sampling clock, it is necessary to ensure the time which corresponds to one period when the frequency of the sampling clock is lowest. In the above-mentioned patent document 1, to decrease the number of delay stages of the variable delay circuit and to reduce the power consumption, a plurality of sampling clocks which have phases thereof slightly shifted from each other are generated by a PLL circuit and the sampling clock which has the phase closest to a phase of the data signal is selected (initial selection). The selected sampling clock is supplied to the variable delay circuit for finely adjusting the phase with respect to the data signal. Further, in the patent document 1, to reduce the power consumption of the variable delay circuit, the transmission of a pulse signal to the delay stages on a rear-stage side which are not used for the delay adjustment is inhibited.

However, in the patent document 1, in the initial selection of the sampling clock, the phases of the actual data signal and the sampling clock are compared with each other and the sampling clock is selected in response to a comparison result and hence, the selection control becomes complicated. As a result, due to a circuit which is operated for the selection control, an advantageous effect that the power consumption of the variable delay circuit can be reduced becomes small.

Further, the initial selection of the sampling clock can be performed only after the data signal is actually read. Since the time elapses until the initial selection is completed, it also takes time until phases of the sampling clock and the data signal agree with each other.

One embodiment of the present invention is explained hereinafter in conjunction with drawings.

Figure 1:
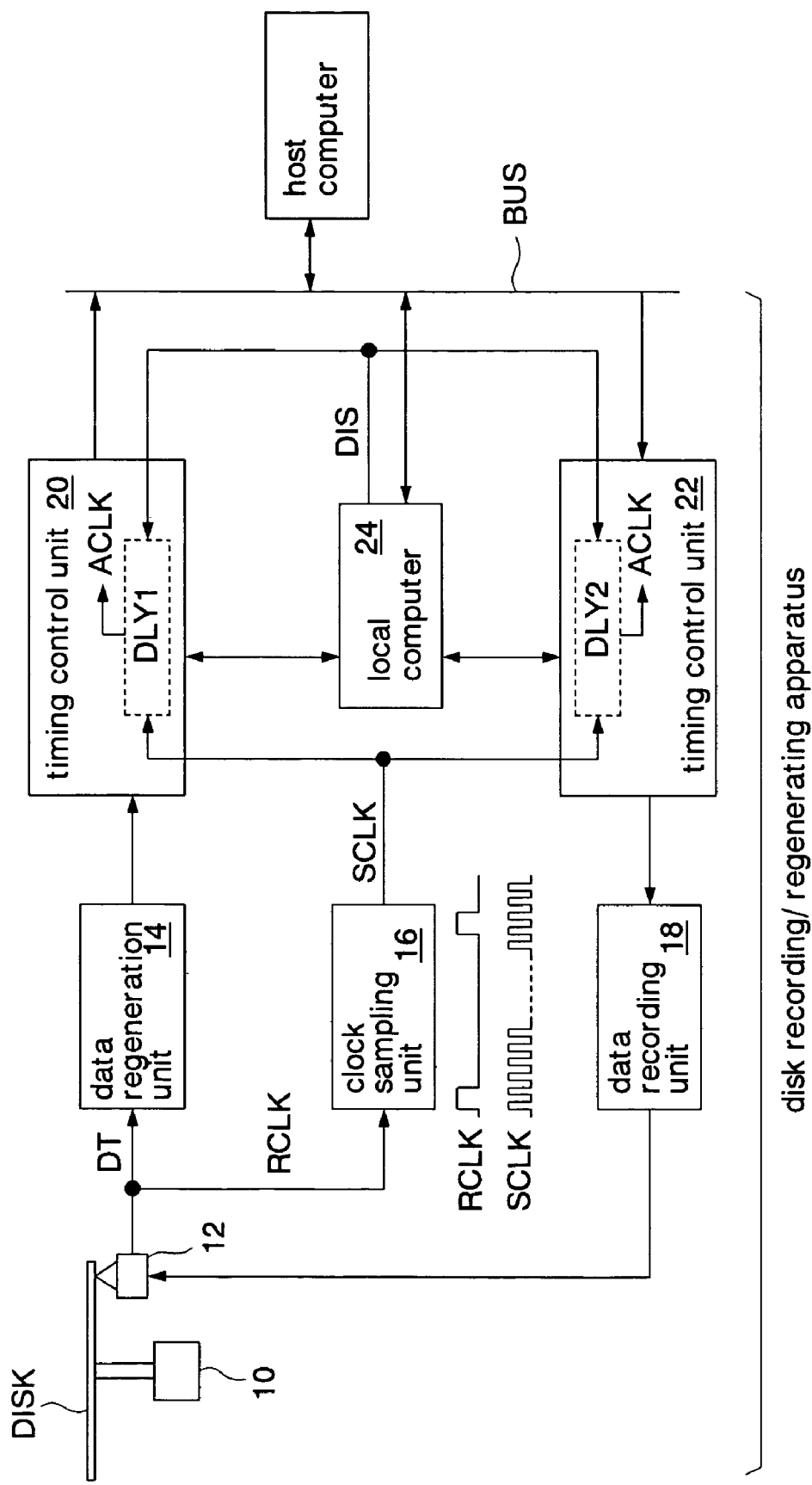
FIG. 1 is a block diagram showing the first embodiment of a disk driving apparatus of the present invention.

FIG. 1 shows the first embodiment of a disk driving apparatus of the present invention. The disk driving apparatus is used as a disk recording/regenerating apparatus (a backup apparatus) which records and regenerates data which is handled by a host computer such as a mainframe, a workstation or the like, for example. The disk recording/regenerating apparatus is connected to a host computer via a system bus BUS.

The disk recording/regenerating apparatus includes a drive motor 10 which rotates an optical magnetic disk DISK (a disk media) which is mounted on the apparatus, an optical pickup 12 which radiates laser beams to the optical magnetic disk DISK, a data regeneration unit 14, a clock sampling unit 16, a data recording unit 18, timing control units 20, 22 and a local computer 24 such as a CPU or the like. The data regeneration unit 14, the clock sampling unit 16, the data recording unit 18, the timing control units 20, 22 and the local computer 24 are formed in one chip as a control LSI. The data regeneration unit 14 and the timing control unit 20 function as a data processing unit which executes a regenerating operation which reads out data from the optical magnetic disk DISK in synchronization with an adjusting clock ACLK. Further, the data recording unit 18 and the timing control unit 22 function as a data processing unit which executes a recording operation for writing data in the optical magnetic disk DISK in synchronization with the adjusting clock ACLK.

Figure 2:
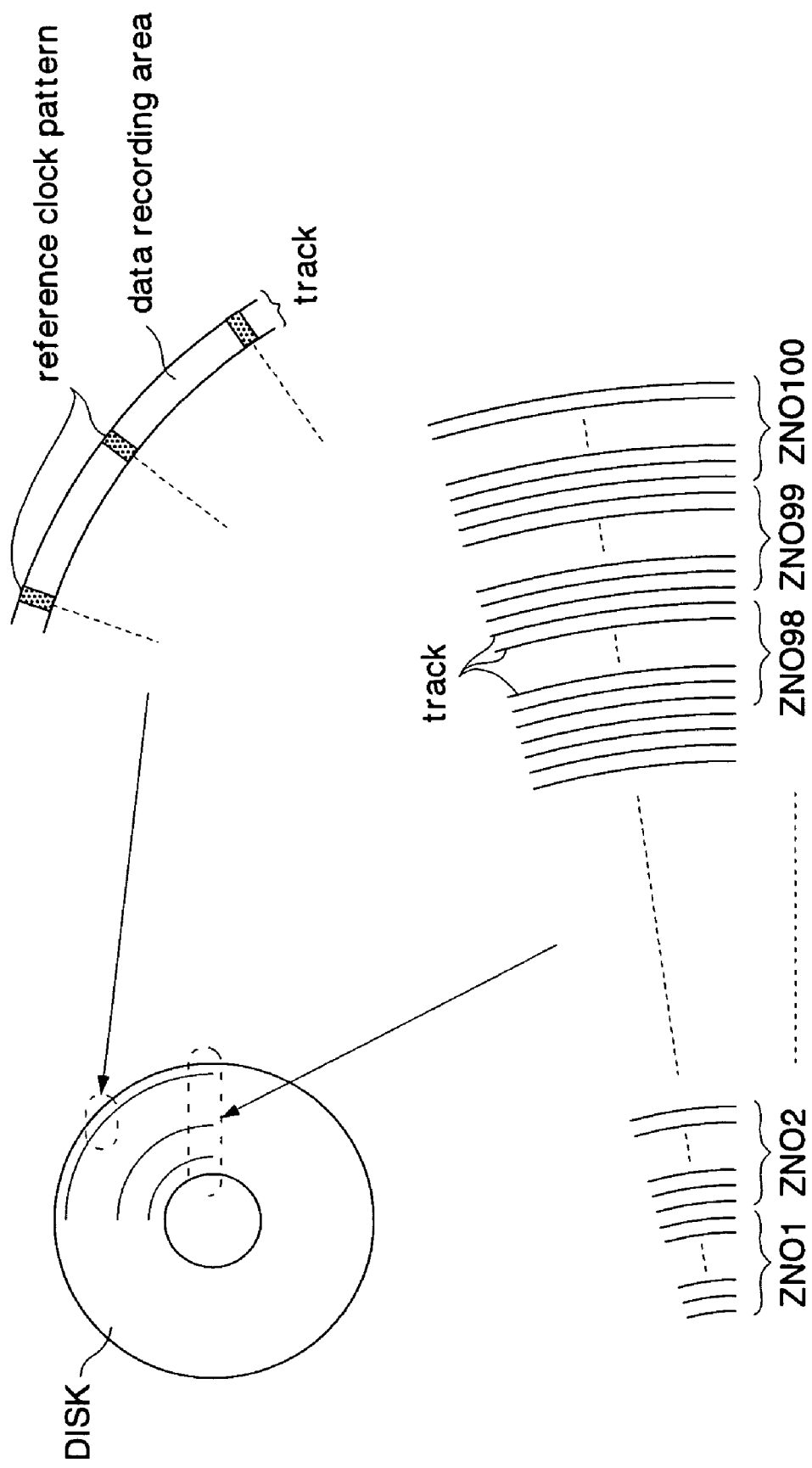
FIG. 2 is an explanatory view showing the summary of an optical magnetic disk which is used in a disk recording/regenerating apparatus.

A plurality of tracks is formed on the optical magnetic disk DISK as shown in FIG. 2 which is described later. In each track, reference clock patterns are formed every given angle during manufacturing process and a data recording area is formed between the reference clock patterns.

The data regeneration unit 14 includes an amplifier and an AD converter. The data regeneration unit 14 amplifies a data signal DT read out via the optical pickup 12 and converts the data signal DT into binary data. The clock sampling unit 16 includes a PLL circuit. The clock sampling unit 16 samples a reference clock RCLK from the reference clock pattern detected via the optical pickup 12. The PLL circuit multiplies the frequency of the reference clock RCLK to generate a sampling clock SCLK.

The data recording unit 18 includes a laser diode. The data recording unit 18 radiates laser beams to the optical magnetic disk DISK via the optical pickup 12 and records data output from the timing control unit 22 in the optical magnetic disk DISK.

The timing control unit 20 adjusts the phase of the sampling clock SCLK to match the phase of sampling clock SCLK and the phase of binary data output from the data regeneration unit 14 using a variable delay circuit DLY1 and generates the adjusting clock ACLK. The timing control unit 20 receives the binary data in synchronization with the adjusting clock ACLK and outputs the received binary data to the host computer via the system bus BUS.

The timing control unit 22 adjusts the phase of the sampling clock SCLK to match the phase of sampling clock SCLK and the phase of binary data output from the data recording unit 18 using a variable delay circuit DLY2 and generates the adjusting clock ACLK. The timing control unit 22 outputs the binary data received from the host computer to the data recording unit 18 in synchronization with the adjusting clock ACLK.

The local computer 24 controls the operation of the whole disk recording/regenerating apparatus. Further, the local computer 24 obtains the recording frequency in response to a zone number ZNO (an access address) which is supplied from the host computer and outputs a disabling signal DIS for disabling the delay stages which are not used in the variable delay circuits DLY1, DLY2. The zone number ZNO indicates a zone including tracks which regenerates or records data in the optical magnetic disk DISK.

FIG. 2 shows the summary of the optical magnetic disk DISK used in the disk recording/regenerating apparatus. In the optical magnetic disk DISK, as described above, the reference clock patterns and the data recording areas are alternately formed for every track. The reference clock patterns are formed for every given angle. The zone is set for a given number of continuous tracks. The zone numbers ZNO (ZNO1–100) are allocated sequentially from the inside of the optical magnetic disk DISK. In this embodiment, 100 pieces of zones are allocated. The recording frequency RF (frequency of the sampling clock) for recording/regenerating the data with respect to the optical magnetic disk DISK is set for every zone. The recording frequency RF is set to a smaller value as the zone approaches the inside where an interval of the reference clock pattern is narrow. The relationship between the recording frequency RF and the zone number ZNO is defined by a formula (1). For example, the recording frequencies of the zone 1 and the zone 10 are respectively 12 MHz and 30 MHz.

$$RF = 2[\text{MHz}] \times ZNO + 10 \text{ [MHz]} \quad (1)$$

Figure 3:
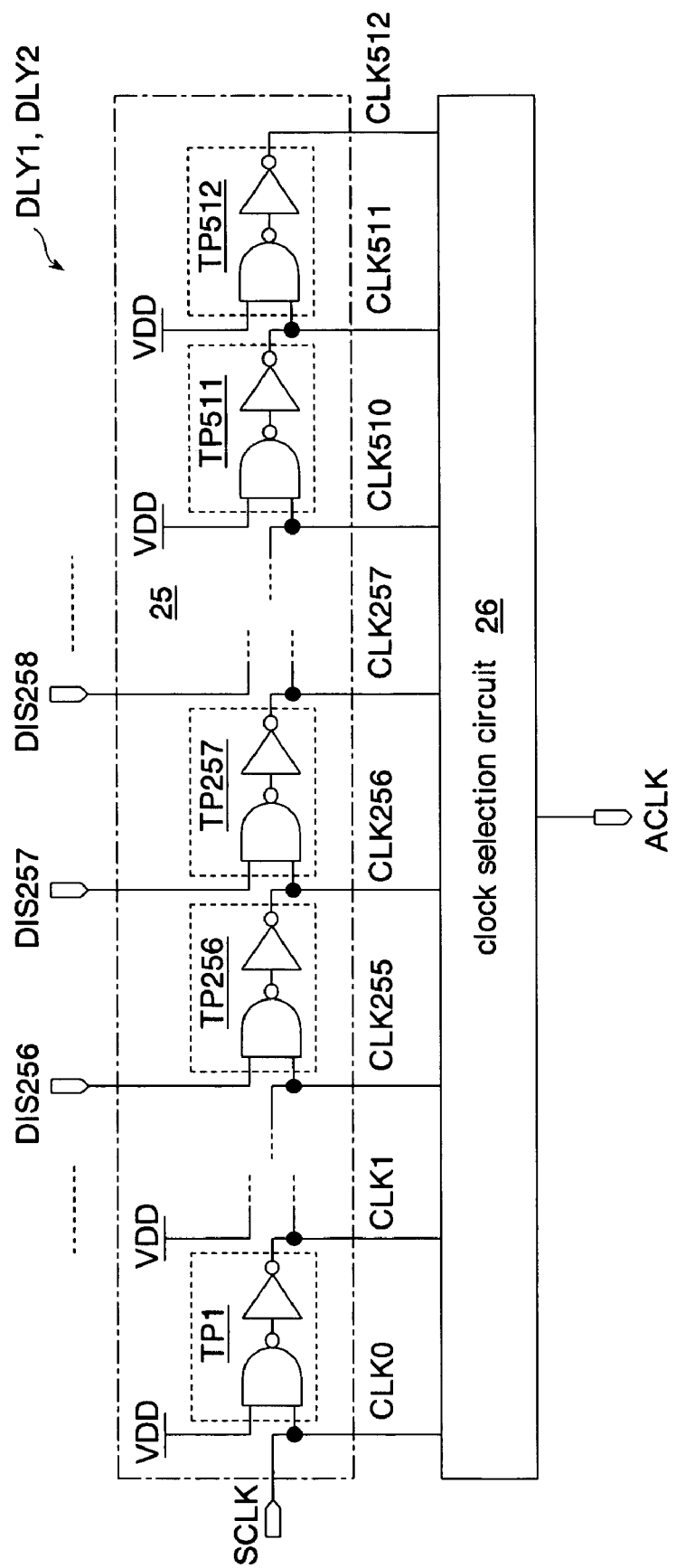
FIG. 3 is a circuit diagram showing the detail of a variable delay circuit shown in FIG. 1.

FIG. 3 shows the detail of the variable delay circuits DLY1, DLY2 shown in FIG. 1. The variable delay circuits DLY1, DLY2 have the same constitution and each circuit includes a delay circuit 25 (first delay circuit) which is constituted of 512 pieces of delay stages TP (TP1–512; first delay stages) which are connected in cascade and a clock selection circuit 26 (a first clock selection circuit) which outputs any one of the delay clocks CLK (CLK1–512) which are respectively output from the delay stage TP as an adjusting clock ACLK.

Each delay stage TP is constituted of a NAND gate and an inverter. The NAND gate has one input thereof connected with an output of the preceding inverter and another input thereof connected with a power source line VDD or a signal line of a disable signal DIS (DIS10–300). When the disable signal DIS assumes the high level, the corresponding delay stage TP transmits the delay clock CLK received from the preceding stage to the succeeding stage. When the disable signal DIS assumes the low level, the corresponding delay stage TP is disabled and an output thereof is fixed to a low level. The ensuing delay stages TP which come next to the delay stage TP which receives the disable signal DIS of low level assume a so-called standby state since inputs to them are fixed. Since neither charging nor discharging is generated with respect to the delay stages TP in the standby state, the power consumption becomes extremely low.

The clock selection circuit 26, in response to the instruction from the local computer 24, outputs any one of the delay clocks CLK0–512 output from the variable delay circuits DLY1 (or DLY2) as an adjusting clock ACLK. That is, the phase of the sampling clock SCLK is adjusted and the adjusting clock ACLK for regenerating or recording the binary data correctly is generated. An adjusting width (a change quantity of the delay time) of the adjusting clock ACLK may preferably correspond to one cycle of the recording frequency used for regeneration or recording of the data. Accordingly, when one cycle of the recording frequency of the zone to be accessed corresponds to the delay time of 32 pieces of delay stages TP (TP1–32), for example, the delay stage TP33 and other ensuing delay stages TP34–512 can be disabled. Here, compared to a case in which the delay clocks CLK are sequentially transmitted to all delay stages TP1–512, the power consumptions of the variable delay circuits DLY1, DLY2 become 1/16 respectively.

Here, as will be described later, in this embodiment, the delay clocks CLK which are necessary for the phase adjustment at the time of getting access to the outermost zone (ZNO=100) are the delay clocks CLK0–CLK16, while the delay clocks CLK which are necessary for the phase adjustment at the time of getting access to the innermost zone (ZNO=1) are the delay clocks CLK0–CLK272. Accordingly, it is sufficient for the local computer 24 shown in FIG. 1 to output the disable signals DIS17–273 corresponding to the delayed stages TP17–273. Since there exists the possibility that the outputs of the delay stages TP1–15 are always used irrespective of the access zone, another inputs of NAND gates of the delay stages TP1–15 are connected with the power source line VDD. The local computer 24 never fails to disable any one of the disable signals DIS17–273. Accordingly, the delay stage TP274 always receives the low-level disable signal from the preceding stage and is disabled. Accordingly, even when other inputs of the NAND gates of the delay stages TP274–512 are connected with the power source line VDD, there is no increase of the power consumption. By reducing the bit number of the disable signal DIS, the wiring areas can be reduced and hence, a chip size of a control LSI can be made compact.

Further, it is unnecessary for the local computer 24 to output all disable signals DIS17–273 corresponding to the delay stages TP17–273. By outputting only the disable signal DIS which corresponds to the delay stage TP which is connected to the final stage of the row of delay stages TP which correspond to one cycle of the recording frequency of each zone, the wiring areas of the disable signals DIS can be minimized.

Figure 4:
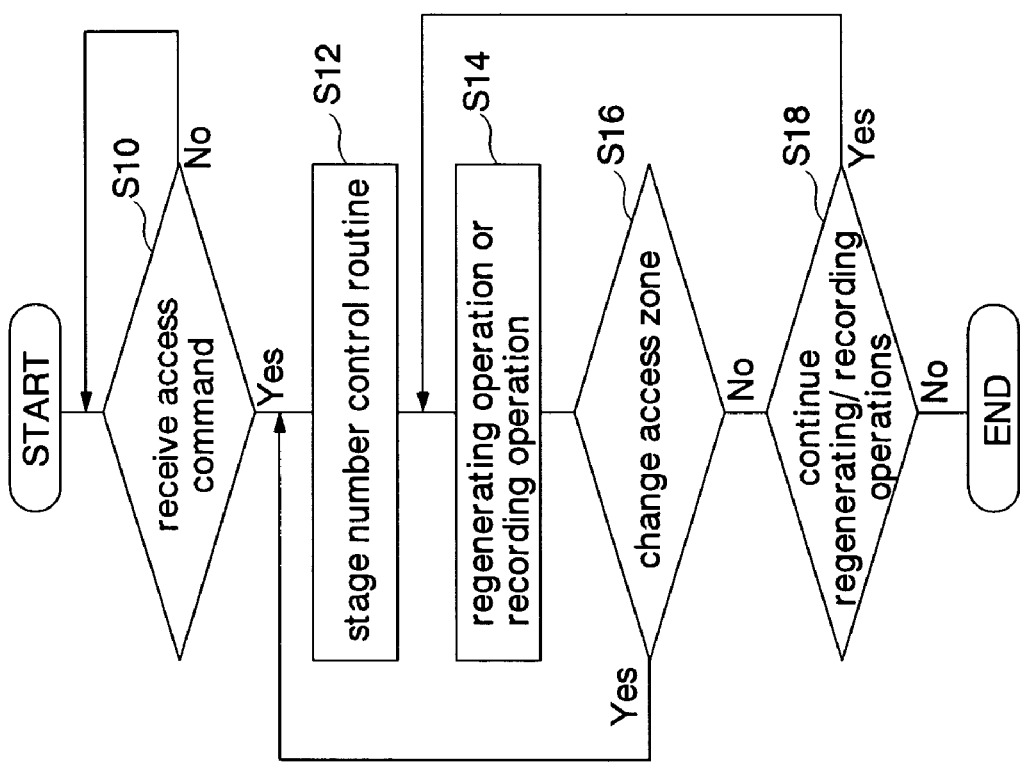
FIG. 4 is a flowchart showing an operation of a local computer for performing recording or regenerating with respect to an optical magnetic disk.

FIG. 4 shows an operation of the local computer 24 at the time of performing the recording or the regenerating with respect to the optical magnetic disk DISK. The operation shown in FIG. 4 is performed by executing a program with the local computer 24.

First of all, in step S10, the local computer 24 stands by until the local computer 24 receives an access command (including a zone number ZNO) from the host computer 26. The local computer 24 moves the processing to step S12 upon receiving the access command.

In step S12, the local computer 24 performs a stage number control routine (FIG. 5 described later), obtains the recording frequency RF of the zone to be accessed, and obtains the number of delay stages TP which are necessary for getting access to the instructed zone. Then, the delay stages TP which are used are enabled and the delay stages TP which are unnecessary are disabled. The enable control of the delay stages TP in the variable delay circuits DLY1, DLY2 is not performed based on the frequency of the sampling clock generated from the reference clock pattern of the optical magnetic disk DISK but is performed based on the recording frequency RF obtained by an arithmetic operation. Accordingly, the number of delay stages TP to be used can be speedily and easily obtained without using the optical pickup 12 and the clock sampling unit 16.

Next, in step S14, the local computer 24 controls the optical pickup 12, the data regeneration unit 14 and the timing control unit 20 or the data recording unit 18 and the timing control unit 22 and executes the regenerating operation or the recording operation of the optical magnetic disk DISK. In step S16, the local computer 24 decides whether the zone number ZNO to which the local computer 24 gets access during the regenerating operation or the recording operation is to be changed or not. When a data quantity to be accessed is large and it is necessary to get access to the neighboring zone, the zone number ZNO is changed. In this case, to newly obtain the number of delay stages TP necessary for access, the processing moves to step S12. When the zone number ZNO to be accessed has no change, the processing moves to step S18.

In step S18, the local computer 24 decides whether the local computer 24 continues the regenerating operation or the recording operation or not. When the local computer 24 does not get access to all data instructed from the host computer 26, the processing is again moved to step S14. When the local computer 24 gets access to all data instructed from the host computer 26, the processing is finished.

Figure 5:
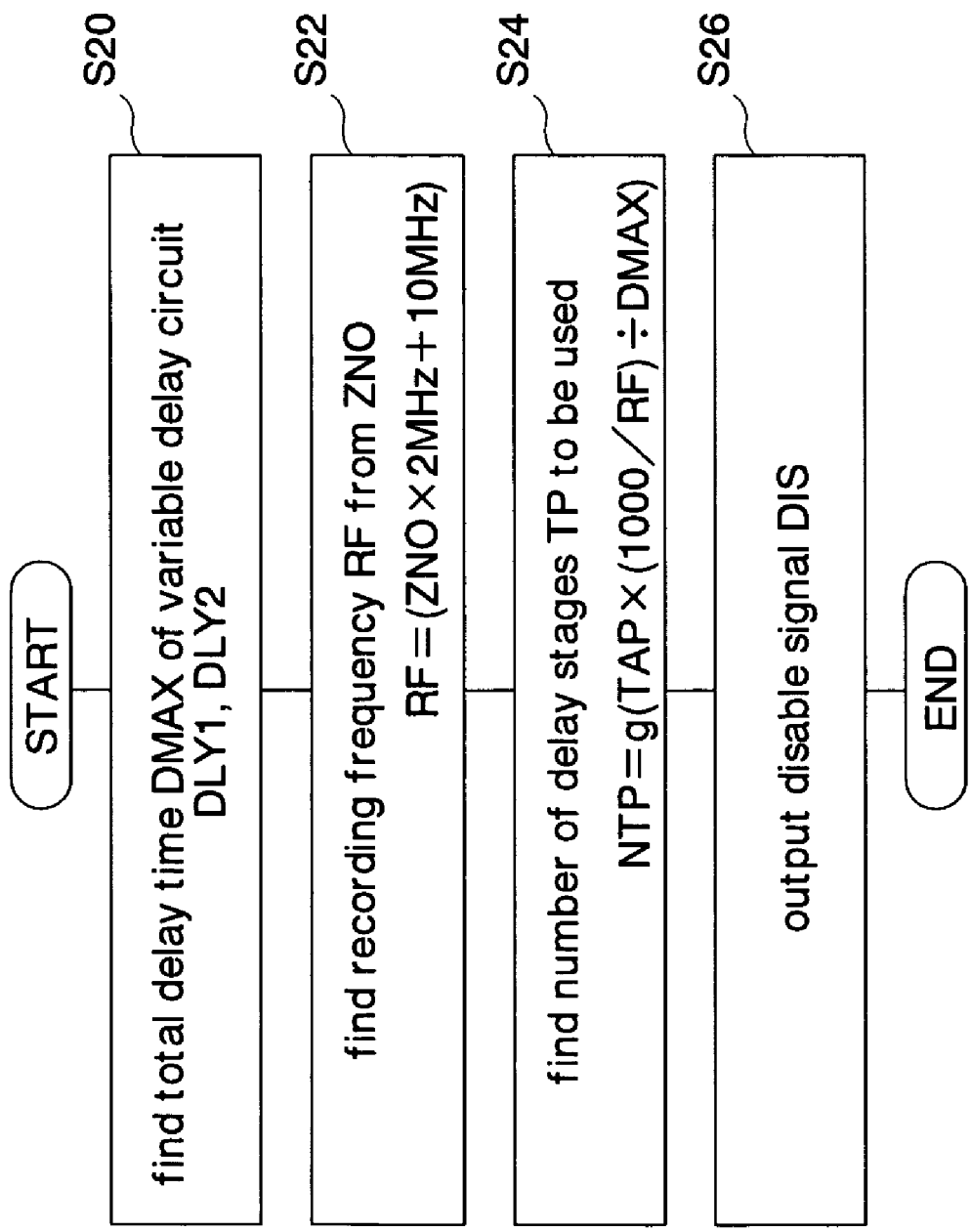
FIG. 5 is a flowchart showing the detail of an access control routine shown in FIG. 4.

FIG. 5 shows the detail of the access control routine shown in FIG. 4. The operation shown in FIG. 5 is performed by executing a program using the local computer 24.

First of all, in step S20, the local computer 24 obtains the total delay time DMAX when all delay stages TP are used for every variable delay circuit DLY1, DLY2. The total delay time DMAX can be obtained by measuring the delay time of the signal which is transmitted through a given number of delay stages TP for every variable delay circuit DLY1, DLY2 and by multiplying the measured time with (total number of delay stages TP÷number of measured delay stages TP). The delay time is measured by obtaining time that the signal is transmitted through the given number of delay stages TP (counter value) using a counter which performs a counting operation in response to a clock signal. Here, in this embodiment, the delay time per delay stage TP (design value under standard conditions) is approximately 0.31 ns and the total delay time DMAX at this point of time is approximately 160 ns.

Next, in step S22, using the formula (1), the recording frequency RF is obtained from the zone number ZNO. In step S24, the stage number NTP of delay stages TP to be used is obtained using a formula (2) described later. Then, in step 524, the local computer 24 disables any one of the disable signals DIS17–273 in response to the obtained number of stages NTP. Accordingly, only the delay stages TP which are necessary for the phase adjustment of the sampling clock at the time of access are enabled and the delay stages TP in the latter stage which are unnecessary for the phase adjustment are disabled.

In this manner, the local computer 24 which performs the access control routine is operated as the operational unit which receives the access address (zone number ZNO), obtains the recording frequency RF of the sampling clock corresponding to the reference clock pattern formed in the area corresponding to the received access address without sampling the reference clock pattern from the optical magnetic disk DISK, and obtains the number of delay stages TP to be used necessary for the phase adjustment of the sampling clock SCLK corresponding to one cycle of the obtained recording frequency RF as well as the delay control unit which enables the delay stages TP the number of which is equal to the obtained number of stages to be used and disables the remaining delay stages TP.

FIG. 6 shows the relationship among the zone number ZNO, the recording frequency RF, and the number of delay stages TP to be used. The number NTP of the delay stages TP to be used is obtained by substituting the recording frequency RF obtained by the above-mentioned formula (1) for the formula (2). The calculation of the number of stags NTP using the formula (1) and the formula (2) is performed when the local computer 24 shown in FIG. 1 executes the program. In the formula (2), TAP indicates the total number (=512) of the delay stages TP and DMAX indicates the total delay time [ns] when all delay stages TP are used. In this example, the total delay time DMAX of 165 ns is obtained as in step S20 shown in the above-mentioned FIG. 5. "g" shows the processing for raising lower-order 4 bits when the value obtained by the TAP×(1000/RF)÷DMAX is expressed by a hexadecimal number. Due to the fraction raising processing (the round-up processing), the number of late stages to be used can be set with tolerance.

$$NTP = g(TAP \times (1000/RF) \div DMAX) \quad (2)$$

For example, when the zone 1 is accessed, 272 is obtained as the number of the delay stages TP to be used. Here, the local computer 24 shown in FIG. 1 disables the disable signal DIS273 at a low level and holds other disable signals DIS17–272 at a high level. The variable delay circuits DLY1, DLY2 disable the delay stage TP273 upon receiving the disabling of the disable signal DIS273. Accordingly, the delay stages TP273–512 are disabled. Further, when the zone 50 is accessed, 32 is obtained as the number of the delay stages TP to be used. Here, the local computer 24 shown in FIG. 1 disables the disable signal DIS33 at a low level and holds other disable signals DIS17–32, 34–272 at a high level. The variable delay circuits DLY1, DLY2 disable the delay stage TP33 upon receiving the disabling of the disable signal DIS33. Accordingly, the delay stages TP33–512 are disabled.

As described above, according to this embodiment, since the delay stages TP which are not used for the delay adjustment are disabled, the power consumption at the time of adjusting the phases of the sampling clocks SCLK which are used for the regenerating operation and the recording operation can be reduced. Further, the delay stages TP to be disabled can be obtained based on the zone number ZNO (access address). That is, it is possible to obtain the delay stages TP to be disabled without getting access to the optical magnetic disk DISK. Accordingly, it is possible to prevent the regenerating operation and the recording operation from becoming complicated. As a result, the power consumption can be reduced with the simple control.

Figure 7:
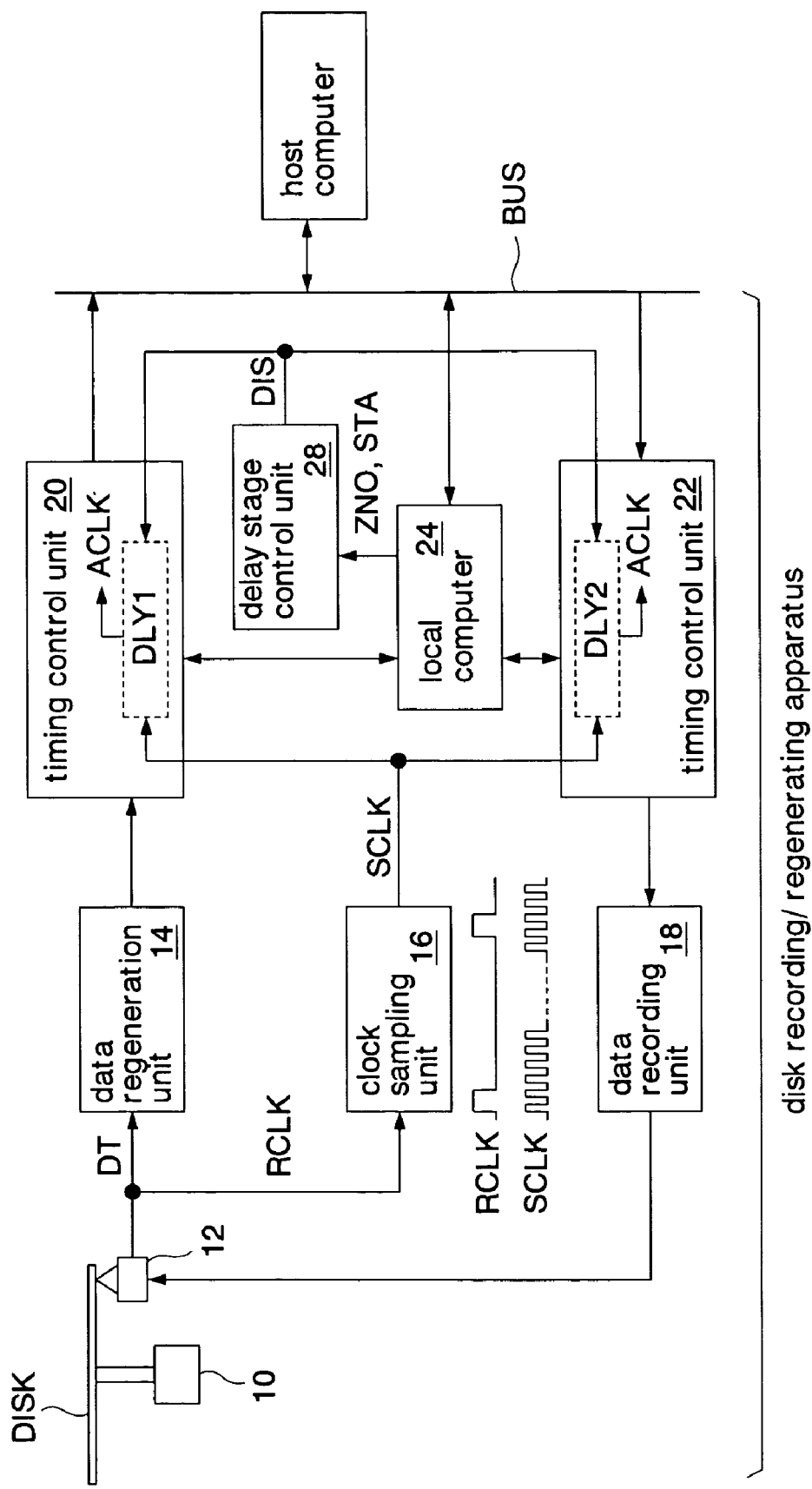
FIG. 7 is a block diagram showing the second embodiment of the disk driving apparatus of the present invention.

FIG. 7 shows the second embodiment of the disk driving apparatus of the present invention. With respect to the elements which are identical with the elements explained in conjunction with the first embodiment, same symbols are attached and the detailed explanation is omitted with respect to these elements. The disk driving apparatus, in the same manner as the first embodiment, is used as a disk recording/regenerating apparatus (a back up apparatus) which records and regenerates data which is handled by a host computer such as a mainframe, a workstation or the like, for example. The disk recording/regenerating apparatus is connected to a host computer via a system bus BUS.

The disk recording/regenerating apparatus is constituted by adding a delay stage control unit 28 to the first embodiment. Other constitutions are equal to the corresponding constitutions of the first embodiment except for a program which the local computer 24 executes. The delay stage control unit 28 obtains the recording frequency RF of the sampling clock SCLK and the number of delay stages TP which the variable delay circuits DLY1, DLY2 use based on the access zone number ZNO output from the host computer via the local computer 24, and any one of the disable signals DIS17–272 is disabled in response to the number of the obtained delay stages TP. That is, the delay stage control unit 28 obtains the recording frequency RF and the number of delay stages TP to be used which are obtained in accordance with the flow chart (program) shown in FIG. 5 of the first embodiment using a hardware. The delay stage control unit 28 starts an arithmetic operation in response to a start signal STA which the local computer 24 outputs.

Figure 8:
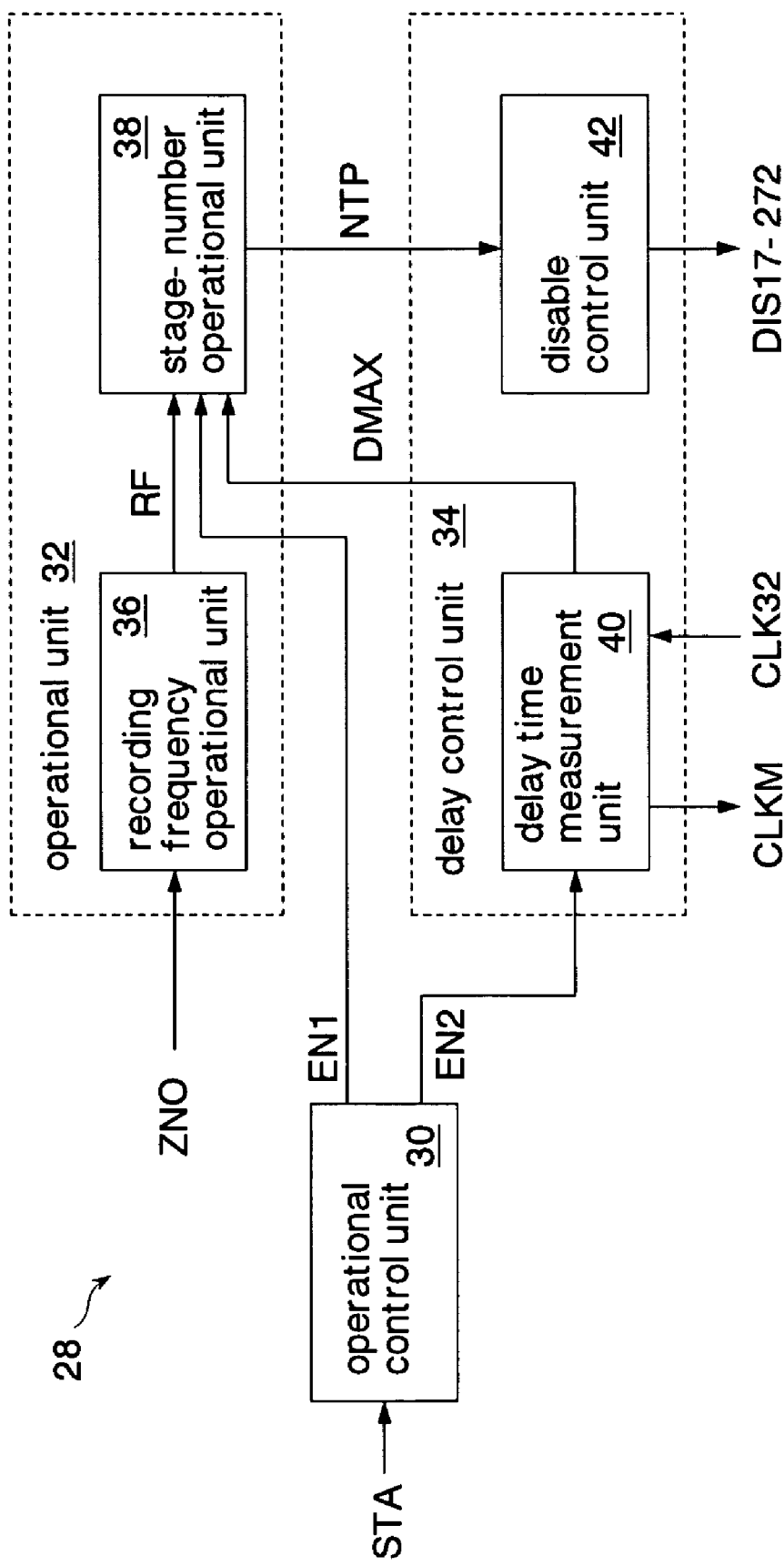
FIG. 8 is a block diagram showing the detail of a delay stage control unit shown in FIG. 7.

FIG. 8 shows the detail of the delay stage control unit 28 shown in FIG. 7. The delay stage control unit 28 includes an operational control unit 30, an operational unit 32 and a delay control unit 34. The operational unit 32 includes a recording frequency operational unit 36 and a stage-number operational unit 38. The delay control unit 34 includes a delay time measurement unit 40 and a disable control unit 42.

The operational control unit 30, in response to the start signal STA from the local computer 24, sequentially outputs enable signals EN2, EN1 which start the delay time measurement unit 40 of the delay control unit 34 and the stage-number operational unit 38 of the operational unit 32. The recording frequency operational unit 36 obtains the recording frequency RF corresponding to the zone number ZNO upon receiving the zone number ZNO. A function of the recording frequency operational unit 36 corresponds to the processing in step S22 shown in FIG. 5.

The stage-number operational unit 38 obtains the number of stages NTP of the delay stages TP to be used based on the recording frequency RF and the total delay time DMAX supplied from the delay time measurement unit 40. A function of the stage-number operational unit 38 corresponds to the processing in step S24 shown in FIG. 5.

The delay time measurement unit 40, for example, supplies a clock CLKM for delay time measurement to an input of the initial-stage delay stage TP1 of either one of variable delay circuits DLY1, DLY2 and receives a delay clock CLK32 which is output from the 32th-stage delay stages TP. Then, the delay time from a transition edge of the clock CLKM to a transition edge of the delay clock CLK32 is measured. The delay time, as explained in the first embodiment, can be measured by obtaining the time (counter value) during which the clock CLKM is transmitted to 32 pieces of delay stages TP using a counter which performs counting in response to the clock signal. Then, by multiplying the measured delay time with 16 (total number 512 of the delay stages TP÷number 32 of measured delay stages TP), the delay time measurement unit 40 obtains the total delay time DMAX when all delay stages TP are used. A function of the delay time measurement unit 40 corresponds to the processing in step S20 shown in FIG. 5.

The disable control unit 42 disables any one of disable signals DIS17–272 in response to the number of stages NTP supplied from the stage-number operational unit 38. A function of the disable control unit 42 corresponds to the processing in step S26 shown in FIG. 5.

Here, it may be possible that the clock CLKM is supplied to the variable delay circuit DLY1 at the time of regenerating operation so as to measure the delay time of the variable delay circuit DLY1, while the clock CLKM is supplied to the variable delay circuit DLY2 at the time of recording operation so as to measure the delay time of the variable delay circuit DLY2. Alternatively, it may be possible that the delay-stage control units 28 are formed for respective variable delay circuits DLY1, DLY2 and the delay times of the variable delay circuits DLY1, DLY2 are respectively measured independently.

Figure 9:
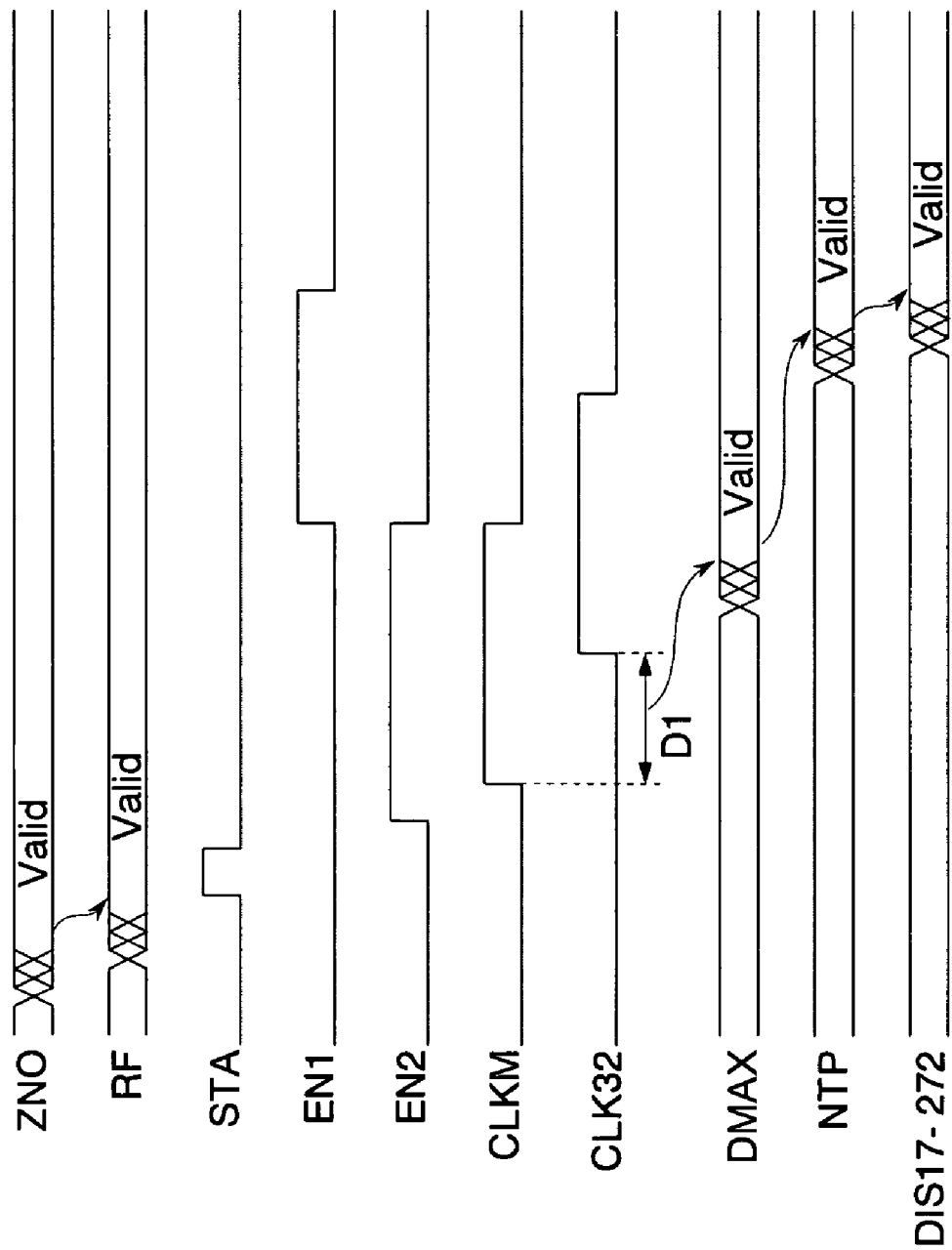
FIG. 9 is a timing chart showing an operation of the delay stage control unit shown in FIG. 8.

FIG. 9 shows an operation of the delay-stage control unit 28 shown in FIG. 8. The recording frequency operational unit 36 calculates the recording frequency RF in response to the zone number ZNO. The operational control unit 30 is operated in response to the start signal STA and the enable signals EN2, EN1 are sequentially enabled. The delay time measurement unit 40 is operated during the enable period of the enable signal EN2, measures the delay time D1 corresponding to 32 stages of the variable delay circuits DLY1, DLY2, and calculates the total delay time DMAX based on the measured result. The stage-number operational unit 38 is operated during the enable period of the enable signal EN1 and calculates the number of stages NTP of the delay stages TP to be used based on the recording frequency RF and the total delay time DMAX. Further, any one of the disable signals DIS17–272 is disabled in response to the number of stages NTP by the disable control unit 42.

As described above, this embodiment can also obtain advantageous effects substantially equal to the advantageous effects of the above-mentioned first embodiment.

Figure 10:
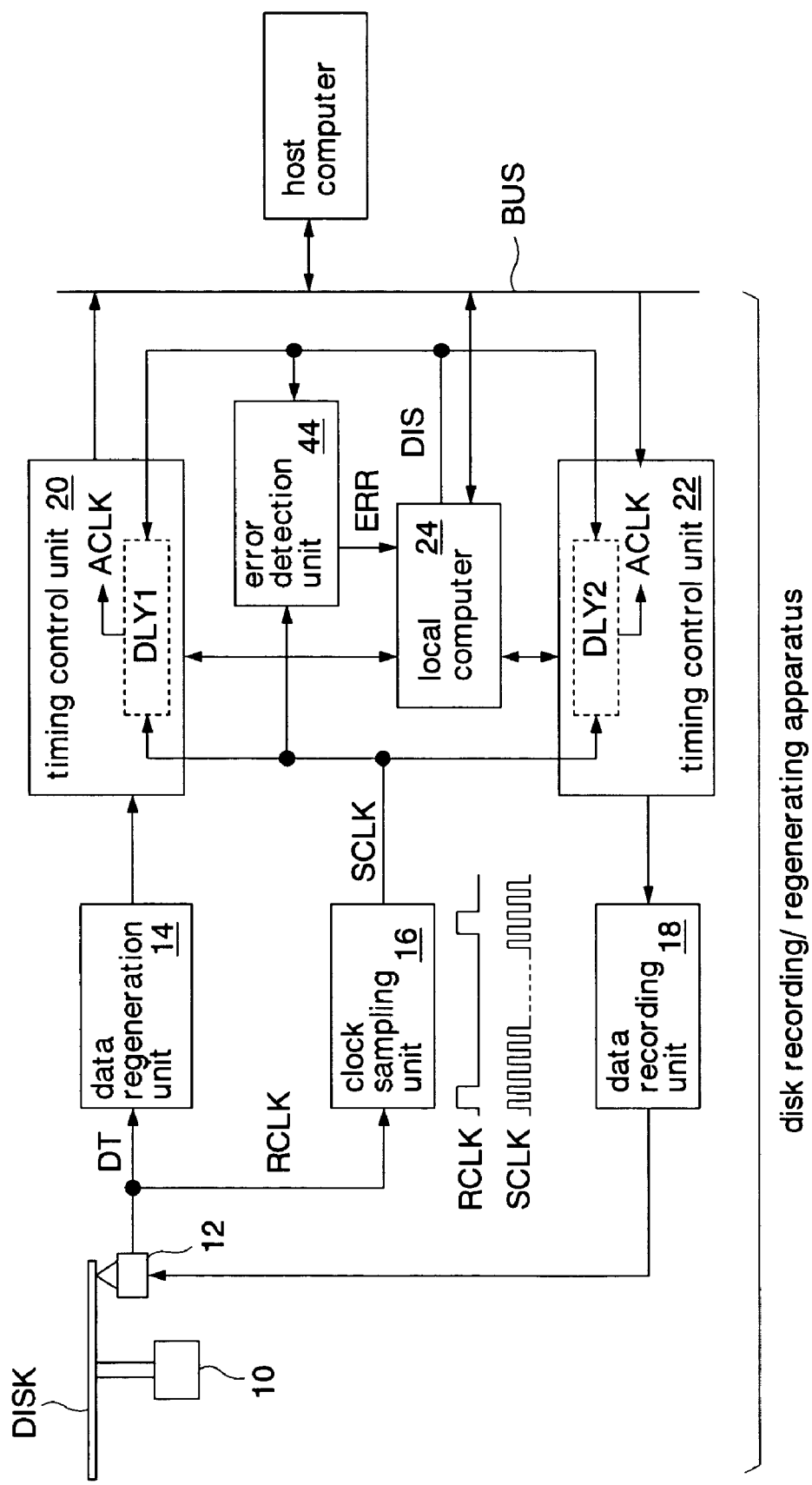
FIG. 10 is a block diagram showing the third embodiment of the disk driving apparatus of the present invention.

FIG. 10 shows the third embodiment of the disk driving apparatus of the present invention. With respect to the elements which are identical with the elements explained in conjunction with the first embodiment, same symbols are attached and the detailed explanation is omitted with respect to these elements. The disk driving apparatus, in the same manner as the first embodiment, is used as a disk recording/regenerating apparatus (a backup apparatus) which records and regenerates data which is handled by a host computer such as a mainframe, a workstation or the like, for example.

The disk recording/regenerating apparatus is connected to a host computer via a system bus BUS.

The disk recording/regenerating apparatus is constituted by adding an error detection unit 48 to the first embodiment. Other constitutions are equal to the corresponding constitutions of the first embodiment. The error detection unit 44 monitors the frequency of the sampling clock SCLK and outputs an error signal ERR to the local computer unit 24 when the frequency of the sampling clock SCLK exceeds a given range set for every zone to be accessed. By providing the error detection unit 44, as shown in FIG. 11, it is possible to inform the host computer a fact that a reference clock pattern formed on an optical magnetic disk DISK physically lacks and hence, the data cannot be accurately regenerated or recorded.

Figure 11:
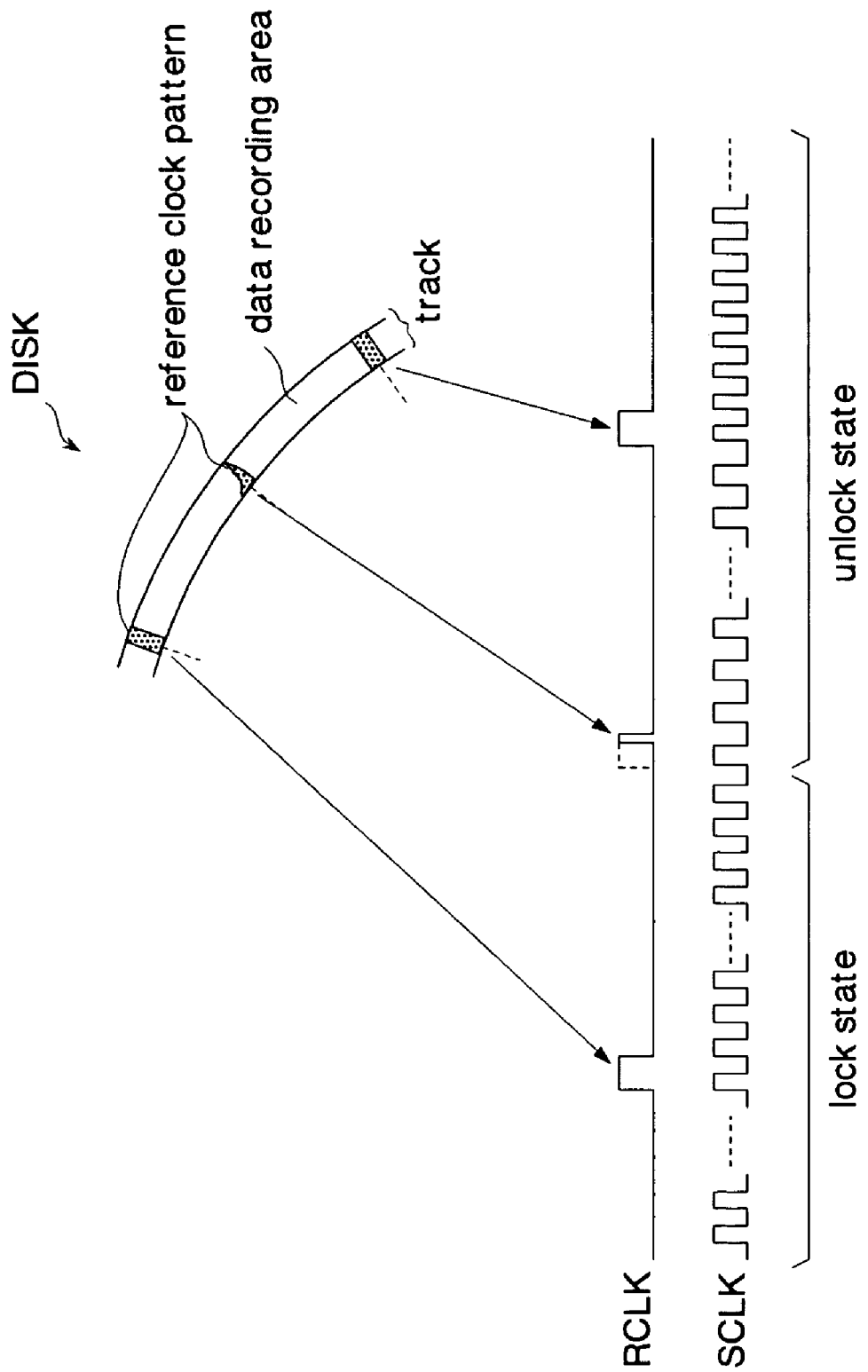
FIG. 11 is an explanatory view showing a state in which a reference clock pattern on an optical magnetic disk is defective.

FIG. 11 shows a stage in which the reference clock pattern formed on the optical magnetic disk DISK physically lacks. Since the reference clock pattern lacks, the interval between the reference clock patterns in front of the defective reference clock pattern and the interval between the reference clock patterns behind the defective reference clock pattern differ from each other. Accordingly, the frequencies of the reference clocks RCLK which are supplied to the clock sampling unit 16 become irregular and hence, a PLL circuit in the inside of the clock sampling unit 16 assumes an unlock state from a lock state. As a result, the frequency of the sampling clock SCLK which is obtained by multiplying the reference clock RCLK is not fixed (unstable) whereby the data cannot be correctly regenerated or recorded. This is a drawback peculiar to the external clock system disk recording/regenerating apparatus.

Particularly, when the disk recording/regenerating apparatus is applied to the backup apparatus of the mainframe or the workstation, different from a case that the disk recording/regenerating apparatus is applied to a DVD recording/regenerating apparatus which records images or the like, the regenerating or the recording of the erroneous data must be absolutely prevented. Accordingly, when the abnormality of the reference clock RCLK is detected, it is desirable that the regenerating operation or the recording operation is not performed and the error is notified to the host computer.

Figure 12:
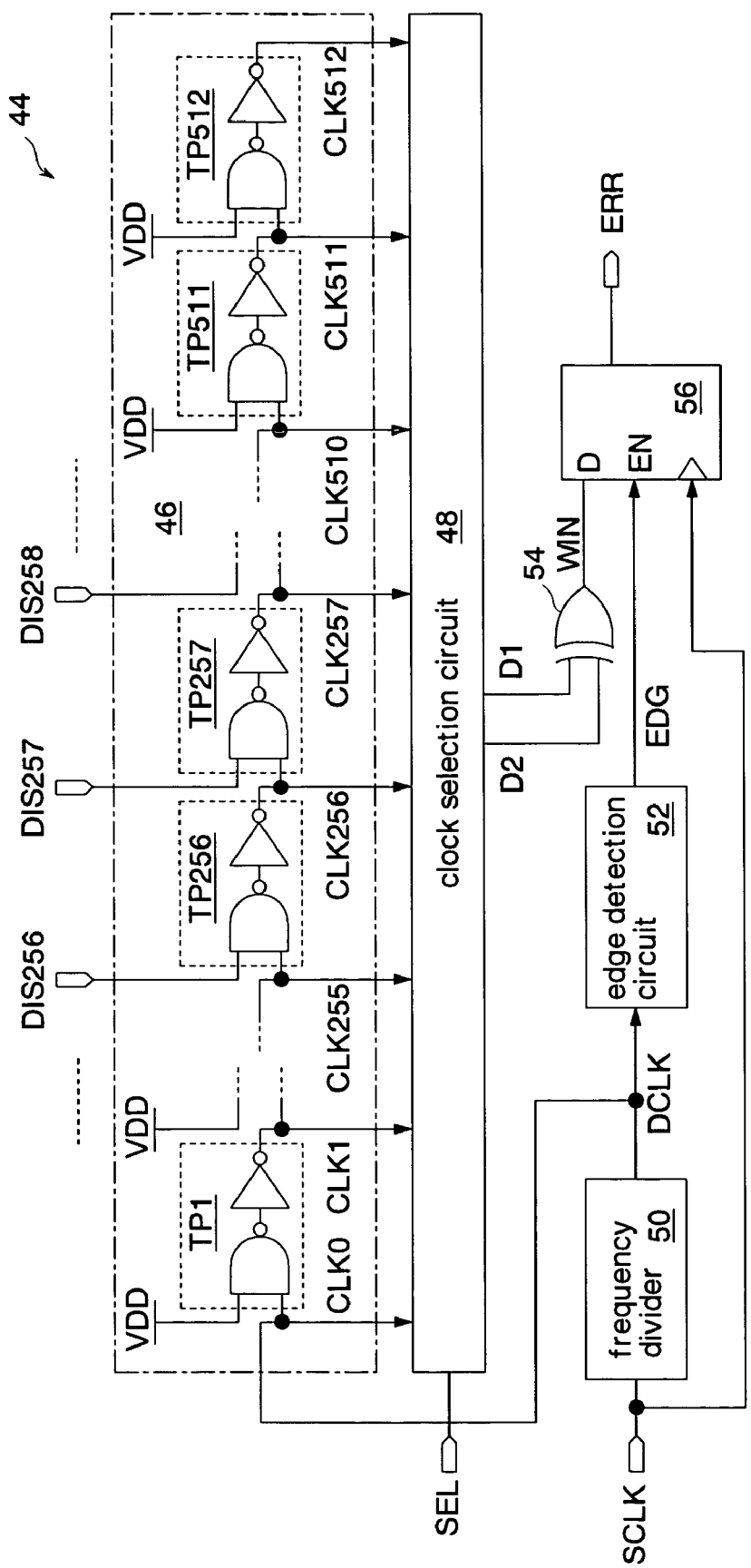
FIG. 12 is a circuit diagram showing the detail of an error detection unit shown in FIG. 10.

FIG. 12 shows the detail of the error detection unit 44 shown in FIG. 10. The error detection unit 44 includes a delay circuit 46 (a second delay circuit), a clock selection circuit 48 (a second clock selection circuit), a frequency divider 50, an edge detection circuit 52, an EOR gate 54 and a latch circuit 56 with an enable terminal.

The delay circuit 46 has the same constitution as the delay circuit 25 of the variable delay circuit DLY1 and includes 512 pieces of delay stages TP1–512 (second delay stages) which are connected in cascade. The delay circuit 46 receives the divided clocks DCLK by dividing the sampling clock SCLK in the delay stage TP1. The delay stages TP17–272 are respectively disabled corresponding to the disabling of the disable signals DIS17–272 from the local computer 24. That is, the positions and the number of the disabled delay stages TP are equal to those of the delay circuits 25 of the variable delay circuits DLY1, DLY2. Since the delay stages TP of the delay circuit 46 can be disabled using the disable signals DIS which control the delay stages TP of the variable delay circuits DLY1, DLY2, the number of signal lines of the disable signal DIS can be reduced. Further, since it is unnecessary to generate the disable signals DIS dedicated to the delay circuit 46, it is possible to prevent the increase of a burden imposed on the local computer 24.

The clock selection circuit 48 selects two delay clocks out of the delay clocks CLK0–512 in response to a selection signal SEL supplied from the local computer 24 and outputs the selected clocks as the delay signals D1, D2 respectively. The delay time of the delay signals D1, D2 with respect to the divided clock DCLK differs for every zone number ZNO to be accessed. Further, the delay time of the delay signal D2 with respect to the delay signal D1 also differs for every zone number ZNO to be accessed. In other words, the generation timing and the pulse width of the window signals WIN described later are set for every zone number ZNO.

The frequency divider 50 generates the divided clocks DCLK which are obtained by dividing the frequency of the sampling clock SCLK in four. An edge detection circuit 52 generates an edge detection pulse EDG having the same pulse width as one cycle of the sampling clock SCLK in synchronization with a rising edge and a falling edge of the divided clock DCLK respectively.

An EOR gate 54 generates a window signal WIN which is changed to a high level when logic values of the delay signals D1, D2 are opposite from each other. The window signal WIN has two high-level periods which are in synchronization with rising edges and falling edges of the delay signals D1, D2. A latch circuit 56 receives the window signal WIN at a data terminal D, receives the edge detection pulse EDG at an enable terminal EN, and receives a sampling clock SCLK at a clock terminal. The latch circuit 56 is operated during a period that the edge detection pulse EDG assumes a high level and latches the logic level of the window signal WIN in synchronization with the rising edge of the sampling clock SCLK. Then, when the latch circuit 56 latches the window signal WIN of low level, the latch circuit 56 decides that the frequency of the sampling clock SCLK deviates from a given range and changes the error signal ERR from the high level to the low level.

The edge detection circuit 52, the EOR gate 54 and the latch circuit 56, when the transition edge of the sampling clock SCLK is not present during a period that the transition edge of the divided clock DCLK is transmitted between two delay stages TP selected by the clock selection circuit 48, are operated as an error decision circuit which outputs an error signal ERR.

Figure 13:
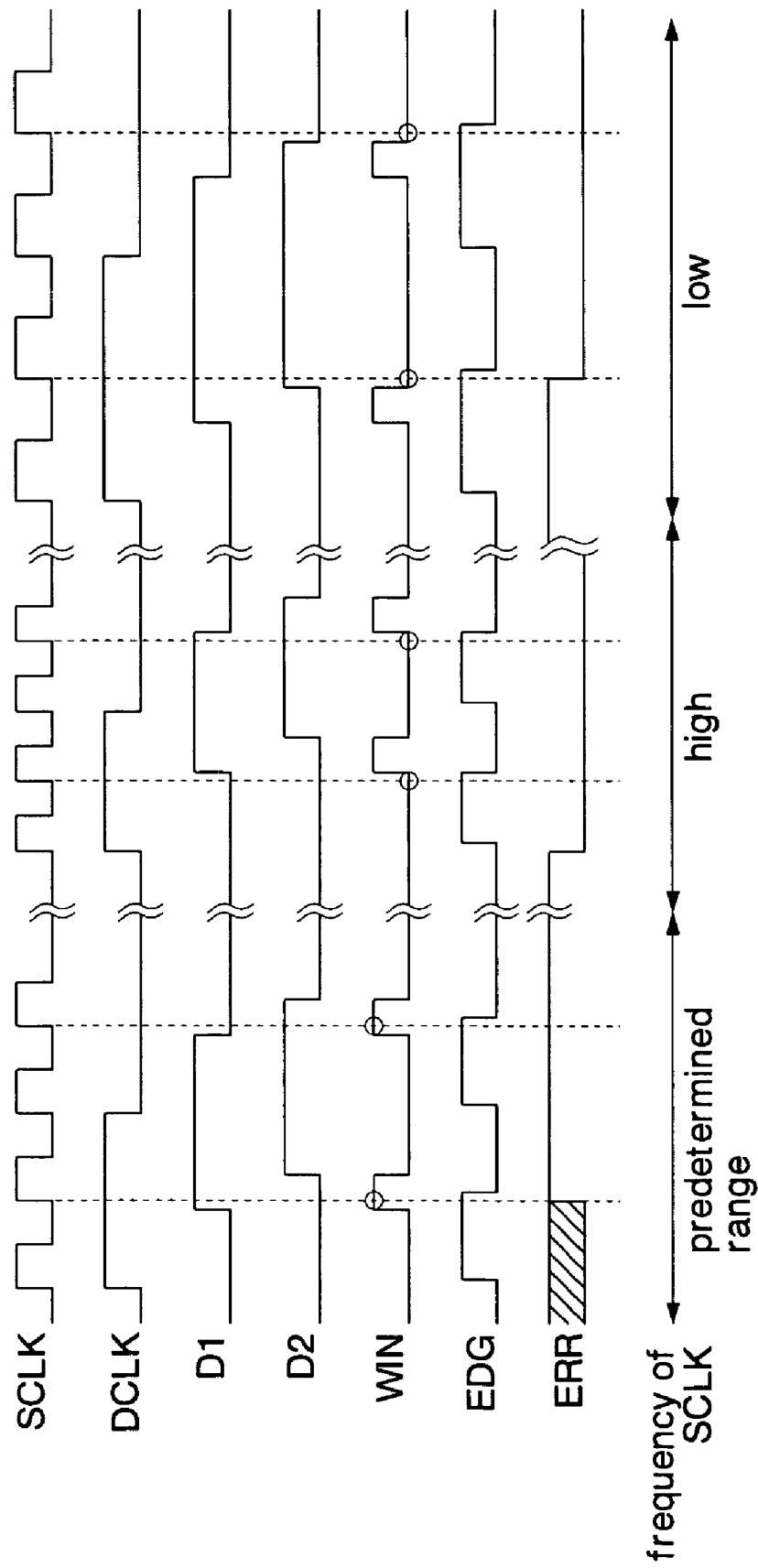
FIG. 13 is a timing chart showing an operation of the error detection unit shown in FIG. 12.

FIG. 13 shows an operation of the error detection unit 44 shown in FIG. 12. When the frequency of the sampling clock SCLK is within a given range, the rising edge of the sampling clock SCLK is present during the high level periods of the window signals WIN which respectively correspond to the rising edges and the falling edges of the delay signals D1, D2. Accordingly, the error signal ERR is held at the high level. That is, the regeneration and the recording of the data with respect to the optical magnetic disk DISK are normally performed.

On the other hand, when the frequency of the sampling clock SCLK is higher or lower than the given range, the rising edge of the sampling clock SCLK is present during the low level period of the window signal WIN. Accordingly, the error signal ERR is changed from the high level to the low level. That is, when the physical lack is present in the reference clock pattern and there exists the possibility that the regeneration and the recording of the data with respect to the optical magnetic disk DISK are not normally performed, this situation is notified to the host computer via the local computer 24. Using the window signal WIN having two high-level periods which synchronize with the rising edges and the falling edges of the delay signals D1, D2, it is decided whether the frequency of the sampling clock SCLK falls within the given range or not. Accordingly, the frequency of the decision is enhanced and hence, the error can be detected more reliably.

As described above, also with respect to this embodiment, it is possible to obtain the substantially same advantageous effects as the above-mentioned first embodiment. Further, in this embodiment, by outputting the error signal ERR from the error detection unit 44, it is possible to surely prevent the execution of the erroneous regenerating operation and the erroneous recording operation. That is, the reliability of the disk recording/regenerating apparatus can be enhanced.

By executing the control of the delay stages TP of the variable delay circuit 46 using the disable signals DIS (by using the disable signals DIS in common), the number of signal lines of the disable signals DIS can be reduced. As a result, it is possible to form the disk recording/regenerating apparatus in a simplified form.

By judging the regeneration error and the recording error at both of the rising edge and falling edge of the divided clock DCLK, the frequency of error decisions can be increased and hence, it is possible to detect the errors more reliably.

By executing the disable control of the delay stages TP each time the zone number ZNO is changed, the frequency of the disable control of the delay stages TP can be lowered and hence, the disable control can be simplified.

Here, in the above-mentioned first to third embodiments, the explanation has been made with respect to the example in which the present invention is applied to the disk recording/regenerating apparatus which gets access to the optical magnetic disk DISK. However, the present invention is not limited to these embodiments. For example, the present invention is applicable to a disk recording/regenerating apparatus which gets access to an optical disk or a magnetic disk such as a DVD, a CD or the like.

In the above-mentioned first to third embodiments, the explanation has been made with respect to the example in which the present invention is applied to the disk recording/regenerating apparatus which regenerates or records the data with respect to the optical magnetic disk DISK. However, the present invention is not limited to these embodiments. For example, the present invention is applicable to a disk driving apparatus dedicated to regeneration which regenerates the data written in an optical magnetic disk, an optical disk or a magnetic disk. Alternatively, the present invention is also applicable to a disk driving apparatus dedicated to recording which records the data in an optical magnetic disk, an optical disk or a magnetic disk.

In the above-mentioned first embodiment, the explanation has been made with respect to the example which obtains the number of delay stages TP to be disabled by executing the program using the local computer 24. However, the present invention is not limited to such an embodiment. For example, a table which indicates the correspondence between the zone number ZNO and the number of delay stages TP to be disabled may be prestored in a memory or the like and the local computer 24 may obtain the number of delay stages TP to be disabled using this table.

In the above-mentioned third embodiment, the explanation is made with respect to the example which adds the error detection unit 44 to the first embodiment. However, the present invention is not limited to such an embodiment. For example, the error detection unit 44 may be added to the first embodiment.

The invention is not limited to the above embodiments and various modifications may be made without departing from the spirit and scope of the invention. Any improvement may be made in part or all of the components.

What is claimed is:

1. A disk driving apparatus comprising:
   a clock sampling unit which generates a sampling clock by multiplying detection frequency of reference clock patterns formed at a given interval along the circumferential direction on a disk media;
   a first delay circuit in which a plurality of first delay stages is connected in cascade, and which outputs delay clocks from the first delay stages, respectively, upon receiving the sampling clock;
   an operational unit which receives addresses which indicate positions in the radial direction on the disk media, obtains recording frequency of the sampling clock corresponding to the reference clock patterns formed in areas corresponding to the addresses by using the received addresses, and obtains the number of stages to be used out of the first delay stages which correspond to one cycle of the obtained recording frequency and are necessary for phase adjustment of the sampling clock;
   a delay control unit which enables the first delay stages the number of which is equal to the number of stages to be used that has been obtained by the operation unit, and disables the remaining first delay stages;
   a first clock selection circuit which selects and outputs any one of the delay clocks output from the enabled first delay stages; and
   a data processing unit which executes at least either one of a regenerating operation to read out data from the disk media and a recording operation to write the data in the disk media in synchronization with the delay clock selected by the clock selection circuit.

2. The disk driving apparatus according to claim 1, further comprising an error detection unit which outputs an error signal when the frequency of the sampling clock is deviated from a frequency range preset for each of the addresses due to a physical lack of the reference clock patterns.

3. The disk driving apparatus according to claim 2, wherein the error detection unit includes:
   a frequency divider which divides the frequency of the sampling clock to generate a divided clock;
   a second delay circuit which has the same constitution as the first delay circuit and includes a plurality of second delay stages connected in cascade, and upon receiving the divided clock, the second delay circuit outputting second delay clocks from the second delay stages, respectively, enabling the second delay stages the number of which is equal to the number of stages to be used that has been obtained by the operational unit, and disabling the remaining second delay stages;
   a second clock selection circuit which, in accordance with the addresses, selects two clocks out of the second delay clocks output from the enabled second delay stages; and
   an error decision circuit which outputs the error signal when a transition edge of the sampling clock is not present during a period in which a transition edge of the divided clock is transmitted between the two selected second delay stages.

4. The disk driving apparatus according to claim 3, wherein the error decision circuit outputs the error signal when a transition edge of the sampling clock is not present during a period in which a rising edge of the divided clock is transmitted between the two selected second delay stages and during a period in which a falling edge of the divided clock is transmitted between the two selected second delay stages.

5. The disk driving apparatus according to claim 1, wherein
the disk media has a plurality of zones which are respectively allocated to a plurality of tracks adjacent to each other,
the reference clock patterns are formed for respective tracks,
each of the addresses indicates one of the zones, and
the operational unit and the delay control unit operate in response to changes of the zones.

6. An operational method of a disk driving apparatus in which a sampling clock formed by multiplying detection frequency of reference clock patterns formed at a given interval along the circumferential direction on a disk media is input to a first delay circuit in which a plurality of first delay stages is connected in cascade, delay clocks are output from the first delay stages, respectively, any one of the delay clocks is selected, and in synchronization with the selected delay clock, at least either one of a regenerating operation to read out data from the disk media and a recording operation to write the data to the disk media is executed, the operational method comprising the steps of:
receiving addresses which indicate positions in the radial direction on the disk media;
obtaining recording frequency of the sampling clock which correspond to the reference clock patterns formed in areas corresponding to the addresses by using the received addresses;
obtaining the number of stages to be used out of the first delay stages which correspond to one cycle of the obtained recording frequency and are necessary for phase adjustment of the sampling clock; and
enabling the first delay stages the number of which is equal to the number of obtained stages to be used and disabling the remaining first delay stages.

7. An operational method of the disk driving apparatus according to claim 6, wherein an error signal is output when the frequency of the sampling clock is deviated from a frequency range preset for each of the addresses due to a physical lack of the reference clock patterns.

8. The operational method of the disk driving apparatus according to claim 7, wherein
the frequency of the sampling clock is divided to generate a divided clock;
the divided clock is received by a second delay circuit which has the same constitution as the first delay circuit and includes a plurality of second delay stages which are connected in cascade, second delay clocks are output from the second delay stages, respectively, and the second delay stages the number of which is equal to the number of stages to be used that has been obtained by the operational unit are enabled and the remaining second delay stages are disabled;
two clocks are selected out of the second delay clocks output from the enabled second delay stages in response to the addresses; and
an error signal is output when a transition edge of the sampling clock is not present during a period in which a transition edge of the divided clock is transmitted between the two selected second delay stages.

9. The operational method of the disk driving apparatus according to claim 8, wherein an error signal is output when a transition edge of the sampling clock is not present during a period in which a rising edge of the divided clock is transmitted between the two selected second delay stages and during a period in which a falling edge of the divided clock is transmitted between the two selected second delay stages.

10. The operational method of the disk driving apparatus according to claim 6, wherein
the disk media has a plurality of zones which are respectively allocated to a plurality of tracks adjacent to each other,
the reference clock patterns are formed for respective tracks,
each of the addresses indicates one of the zones, and
the number of stages to be used out of the first delay stages is obtained in response to changes of the zones, and an enable/disable control of the first delay stages is executed.

* * * * *